(12) United States Patent
Conturie et al.

(10) Patent No.: US 6,587,429 B1
(45) Date of Patent: Jul. 1, 2003

(54) SYSTEM AND METHOD FOR INITIALIZING PHASE CHANGE RECORDING MEDIA

(75) Inventors: Yves G. Conturie, Needham, MA (US); John M. Guerra, Concord, MA (US)

(73) Assignee: Polaroid Corporation, Waltham, MA (US)

( * ) Notice: Subject to any disclaimer, the term of this patent is extended or adjusted under 35 U.S.C. 154(b) by 0 days.

(21) Appl. No.: 09/441,005

(22) Filed: Nov. 16, 1999

(51) Int. Cl.⁷ .................................................. G11B 5/84
(52) U.S. Cl. ................... 369/284; 430/270.13; 369/116
(58) Field of Search ............................ 369/14, 275.2, 369/44.27, 116, 284, 15; 430/320, 321, 270.13; 428/64.1, 64.4

(56) References Cited

U.S. PATENT DOCUMENTS

| | | | |
|---|---|---|---|
| 3,530,441 A | 9/1970 | Ovshinsky | 340/173 |
| 3,716,844 A | 2/1973 | Brodsky | 340/173 |
| 4,415,958 A | 11/1983 | Guerra | 362/301 |
| 4,460,636 A | 7/1984 | Watanabe | 428/212 |
| 4,716,560 A | 12/1987 | Itonaga | 369/275 |
| 5,534,385 A | 7/1996 | Spahn | 430/270.13 |
| 5,535,180 A * | 7/1996 | Shimamori et al. | 369/13 |
| 5,557,599 A * | 9/1996 | Ohkubo | 369/116 |
| 5,646,930 A * | 7/1997 | Furumiya | 369/116 |
| 5,684,778 A | 11/1997 | Yamada et al. | 369/100 |
| 5,768,221 A * | 6/1998 | Kasami et al. | 369/14 |
| 5,784,353 A | 7/1998 | Matsui | 369/102 |
| 5,875,160 A * | 2/1999 | Harigaya et al. | 369/44.27 |
| 5,976,617 A * | 11/1999 | Hong et al. | 427/162 |
| 6,060,221 A | 5/2000 | Furukawa et al. | 430/321 |
| 6,094,405 A * | 7/2000 | Ogawa | 369/14 |
| 6,256,286 B1 * | 7/2001 | Ogawa | 369/116 |
| 6,278,674 B1 * | 8/2001 | Araki et al. | 369/54 |
| 6,373,802 B1 * | 4/2002 | Hattori et al. | 369/53.27 |
| 6,373,814 B2 * | 4/2002 | Kasami et al. | 369/275.2 |
| 6,445,669 B1 * | 9/2002 | Hattori et al. | 369/116 |
| 6,452,891 B1 * | 9/2002 | Hennessey | 369/116 |

FOREIGN PATENT DOCUMENTS

| | | |
|---|---|---|
| EP | 0 706 179 A3 | 4/1996 |
| EP | 0 706 179 A2 | 4/1996 |
| EP | 0 848 379 A2 | 6/1998 |
| EP | 0 848 379 A3 | 8/2000 |
| JP | 62 250 533 | 10/1987 |
| JP | 63 261 553 | 10/1988 |
| JP | 01 122 043 | 5/1989 |
| JP | 01 208 737 | 8/1989 |
| JP | 02 029 953 | 1/1990 |
| JP | 10 021 587 | 1/1998 |
| JP | 11 134 723 | 5/1999 |

OTHER PUBLICATIONS

PCT International Search Report, dated Jun. 1, 2001 PCT/US00/31169.
WIPO Publication, WO 99/30318 Jun. 17, 1999.

* cited by examiner

*Primary Examiner*—Tan Dinh

(57) ABSTRACT

A method and system for initializing and formatting a recording media comprising phase change material using a uniform field of radiation. Also a method for initializing phase change material on a continuous web which will be used to manufacture a plurality of recording media.

29 Claims, 5 Drawing Sheets

SYSTEM AND METHOD FOR INITIALIZING PHASE CHANGE RECORDING MEDIA

FIELD OF THE INVENTION

This invention in general relates to the field of optical recording and in particular to a system and method for initializing and formatting phase change recording media.

BACKGROUND OF THE INVENTION

The use of optically recordable phase change material is known in the art. For example, U.S. Pat. No. 3,530,441 issued to Ovshinsky discloses a semiconductor material disposed on a substrate. Data is recorded by providing radiant energy to discrete portions of the semiconductor material so as to change a physical property, and data is read by sensing a difference in the material's physical properties, such as surface reflectance. A phase change material such as $Te_xSb_yGe_z$ (Tellurium Antimony Germanium) ("TAG") can be used as the active layer of a recording medium. Information is recorded by reversibly forming amorphous bits in the crystalline TAG recording layer. Other chalcogenic alloys such as Te—Sn—Ge can also be used as the phase change material. Before data can be recorded on this material, it must be initialized into the more highly reflective crystalline c-phase. The recording layer, which is initially amorphous, can be selectively converted into a crystalline layer by a temperature treatment. The energy to heat the recording layer is provided by laser beams in industry standard initialization devices. A material having a low birefringence, such as polymethyl methacrylate (PMMA), is typically used as a protective layer and substrate for the recording medium, where the light is transmitted through said substrate. On the other hand, the advent of near-field optical recording places the recording layer on top of this substrate, with a much thinner protective layer applied.

The initialization time for a 1 mw–5 mw laser with a 0.35 micron spot diameter, which converts the phase change material into a crystalline structure is approximately 50–300 nanoseconds. The time to initialize an entire recording medium is the time required for converting the initially amorphous material to a crystalline phase. Even with the use of a powerful laser as the radiation source, the initialization time can be relatively long. For example, the initialization time crystallizing the phase change material in an entire CD-RW disk recording medium consisting of a TAG alloy may be on the order of 15 seconds.

The linear speed of the rotating element depends on the type of information which is recorded, for example audio information, video information or data information. For example the typical linear speed is from 1 to 20 m/sec. During the data recording process, the crystalline recording material is heated above the melting temperature by exposure to radiation, typically from a laser source. This produces a localized melting area which cools so rapidly that no crystallization takes place, and a localized amorphous information area is formed. If the pulse time of the recording laser beam is on the order of from 20–100 ns, the localized amorphous information areas have small diametrical dimensions of at most one or a few micrometers so that a high information density is obtained.

In the erasing process the amorphous information areas are exposed to radiation, comprising an erasing spot, by which the amorphous area is heated to a temperature which is slightly lower than the melting-point of the material in the crystalline phase but is higher than the glass transition temperature. The amorphous area becomes less viscous and returns to the thermodynamically more stable crystalline state. It is necessary that the material be kept at the elevated temperature for a minimal period of time (the erasing time) in order to complete crystallization in the area.

A further time consuming problem with known initialization methods is that each individual disk must be loaded onto the apparatus, brought up to speed, initialized track by track, spun down, and unloaded. This process consumes additional handling time. Another requirement of the initialization process is the need for continuous laser power to initialize an entire CD disk. In addition to the time required, another problem in initializing recording media is uneven initialization and cracking or other destruction of the phase change material layer.

The limitations of the existing art highlight the need for a system and method to mass produce and initialize phase change recording media more reliably, efficiently, and with greater flexibility. While the art describes a variety of recording media with associated initialization techniques, there remains a need for improvements that offer advantages and capabilities not found in presently available initialization devices. It is a primary object of this invention to provide such improvements.

SUMMARY OF THE INVENTION

One object of the present invention is an improvement in the speed with which phase change recording media can be initialized. A further object is to minimize the handling time for an individual disk in the initialization process by initializing the media with a single exposure without having to initialize each track of a rotating disk. Another object is to limit the energy exposure time and intensity to the media, such that there is no surplus energy after initialization that can form deleterious surface in the form of cracking. Other objects include but are not limited to obtaining higher uniformity, compatibility with web-processed media including tape, and providing the ability to pre-process the media with data or encryption. Finally, it is an object of the invention to provide a whole-field optical initialization, rather than a serially exposed initialization.

The present invention is a system for initializing a recording medium comprising phase change material having at least an amorphous state and a crystalline state. The transformation between the states is effected by incident radiation. The radiation can be generated from a white light source, from a flash lamp, or from coherent radiation of wavelength $\lambda$. It is another object of the invention to provide for a method initializing phase change recording media more rapidly than conventional means by avoiding the extensive handling of individual disks. A further object of the invention is to initialize the phase change material uniformly without cracking or destroying the phase change layer.

In accordance with the present invention, the foregoing objectives are achieved with a system using radiation from a flash lamp, a white light source, or a combination of coherent radiation of one or more wavelengths, converting the radiation into a substantially uniform field of radiation over a predetermined area covering the dimensions of the recording medium containing the phase change material, and controlling the power of said uniform field of radiation to produce a surface power density and exposure duration sufficient to convert the phase change material into the crystalline state without cracking or otherwise destroying the material.

These objectives are further achieved in accordance with the present invention with a method of initializing large areas of recording surface in more than one exposure. A further object is the ability to initialize phase change recording media on a continuous web of phase change material applied to a substrate. Yet another object of the invention is the ability to record information on the medium at the time of initialization. Still another object is to expose the media in such a way that full initialization is not reached such that the media is seeded with crystallization predisposition sites that may be subsequently developed to full initialization with another exposure or may facilitate writing smaller marks in the media drive. Other features of the invention will be readily apparent when the following detailed description is read in connection with the drawings.

BRIEF DESCRIPTION OF THE DRAWINGS

The structure and operation of the invention, together with other objects and advantages thereof, may best be understood by reading the detailed description to follow in connection with the drawings in which unique reference numerals have been used throughout for each part and wherein.

DESCRIPTION OF THE PREFERRED EMBODIMENTS

Figure 1:
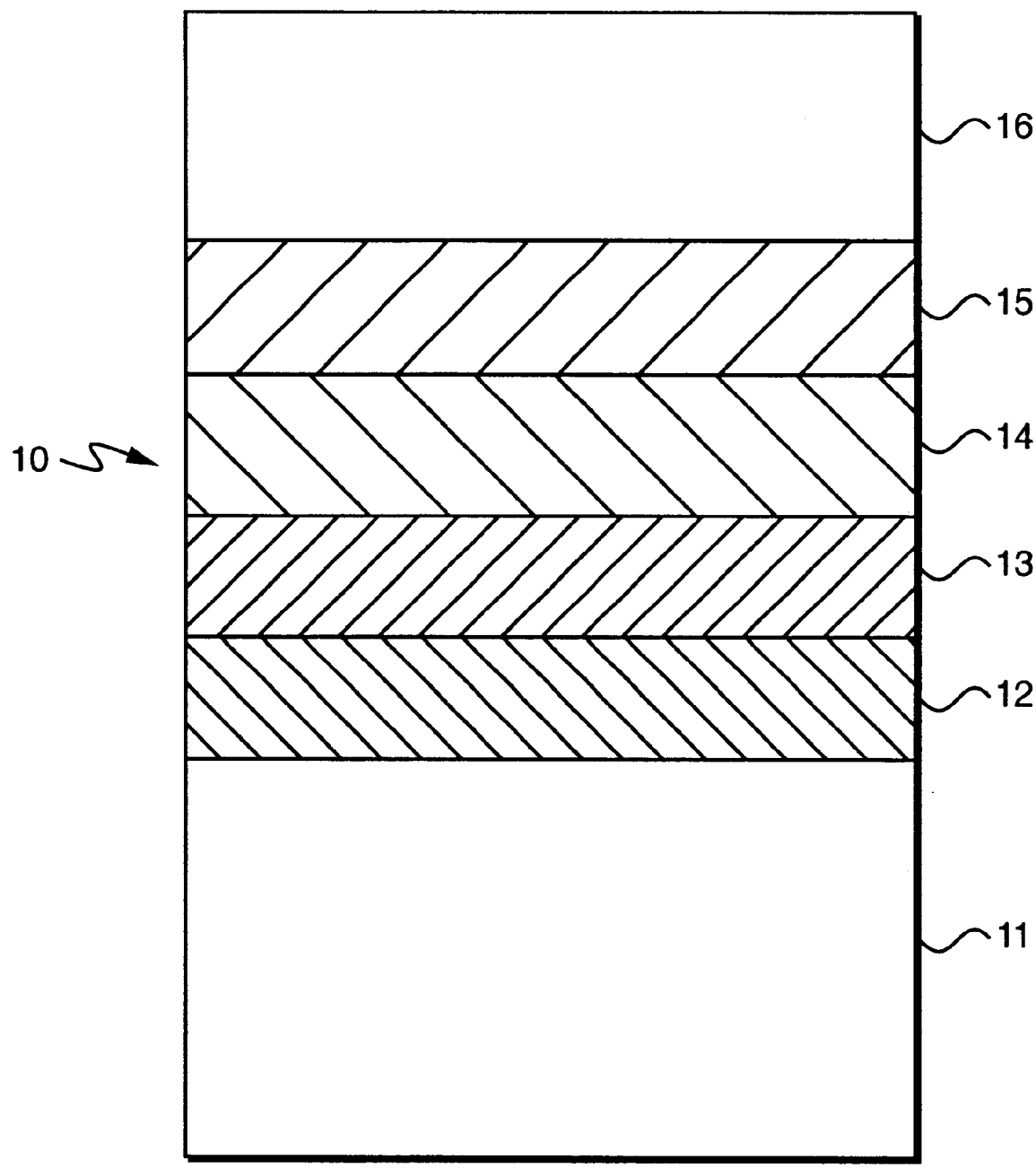
FIG. 1 is a diagrammatic cross-sectional view of a recording medium containing phase change material which can be initialized according to the present invention.

FIG. 1 shows a cross section of a typical recording medium 10 having a protective layer 11, a first dielectric layer 12, a active material layer 13, a second dielectric layer 14, a reflective layer 15 and a substrate layer 16. The initialization system according to the present invention is not limited to a specific recording technology or specific construction of the recording medium. The recording medium could contain fewer or greater number of layers. Active layer 13 may comprise a "write once" material, a read only material, or a material in which the written data can be "erased" (i.e., a rewriteable material). For example, active layer 13 may comprise any of the optically-active materials used in conventional optical storage media, such as magneto-optical (MO) or phase change materials. As can be appreciated by one skilled in the relevant art, additional optically-active materials that are initialized by heating with external radiation, in accordance with the present invention, include: photoresist, photorefractive polymers or crystals, photopolymers, chalcogenide glasses and compounds, photographic silver halide or other emulsions, fluorescently active materials. Examples of photo-refractive materials include $LiNbO_3$ and $BaTiO_3$. Examples of phase change materials are erasable alloys such as $Te_xSb_yGe_z$ or $Te_xSb_yGe_zSe_w$. A mix of crystal structures, cubic and hexagonal, are formed when the phase change material is initialized according to the present invention. Additionally gray scale material able to contain multilevel information in a spot sized area can be initialized with the system according to the present invention.

Figure 2:
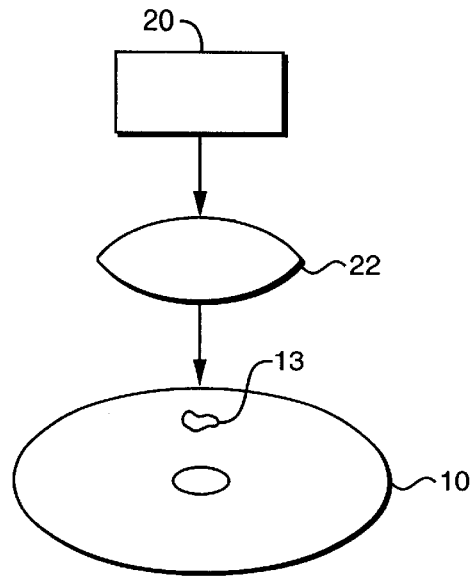
FIG. 2 is a diagrammatic view of a conventional disk initialization system.

There is shown in FIG. 2 a generalized diagrammatical view of a conventional system for initializing an optical recording medium 10 comprising a phase change material. In operation, a source of radiation, such as laser 20 is used with an objective lens 22 to irradiate a local portion of surface 13 of medium 10 for a duration of 50–300 nsec or more to change the structure of the phase change material between amorphous and crystalline states. Erasing is generally achieved by applying a power level of 1.7 to 3.6 milliwatts, and writing is accomplished by applying a power level of at least 5 milliwatts over an area of diameter 0.35 micron.

Figure 3:
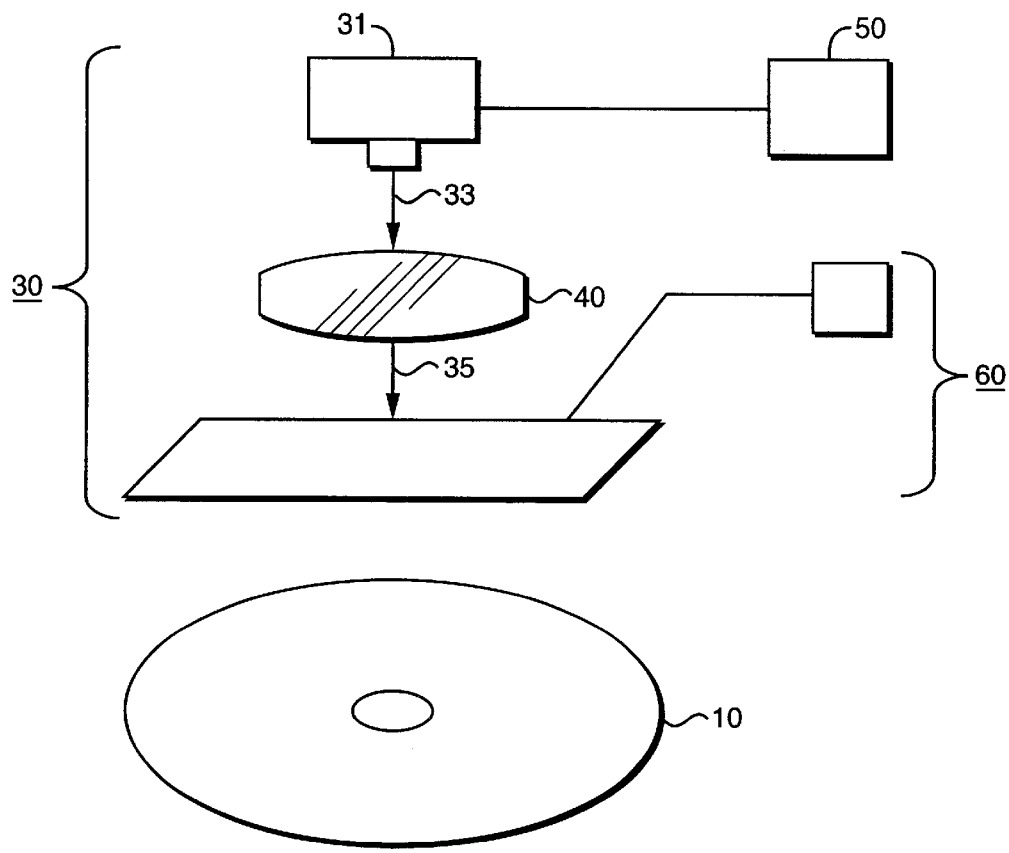
FIG. 3 is a diagrammatic view of the disk initialization system according to the present invention.

There is shown in FIG. 3 a system 30 for initializing optical recording medium 10 in accordance with the present invention. System 30 comprises a source of radiation 31, such as a flash lamp in a preferred embodiment, emitting radiation 33 in a range of wavelengths from 350–980 nanometers, an optical system 40 for converting radiation 33 into a uniform field of illumination 35, and a control system 50 for controlling the duration and intensity of illumination 35 at medium 10. The correct pulse length of the flash lamp is critical to proper initialization of the medium. In a preferred embodiment the flash lamp pulse length is approximately 1 millisecond or less. In an alternate embodiment a continuous radiation source can be used by transporting the media past the source, thereby again controlling and limiting the time that the media is exposed to the radiation. The invention is not limited to a specific source of energy, and the only requirement is that the radiation incident on the medium can effect the phase change without cracking or destroying the phase change material.

Information Recorded During Initialization

It is possible to record information on the recording medium during initialization. For example, servo tracks can be recorded in an optical medium by using a mask containing servo track information and irradiating the masked medium. Alternatively as shown in FIG. 3, there could be disposed a spatial light modulator 60 between optical system 40 and medium 10 for the purpose of imprinting a desired pattern on medium 10. In another embodiment a fixed proximal mask (not shown) could be disposed between optical system 40 and medium 10 for the purpose of imprinting a desired pattern on medium 10. The pattern imprinted on medium 10 could contain timing information, data, and security information either separately or in combination. In yet another embodiment (not shown), the mask could be located on the end face of a light tunnel, and relay optics would project an image of the mask onto the media, with or without magnification.

Initialization

Figure 4:
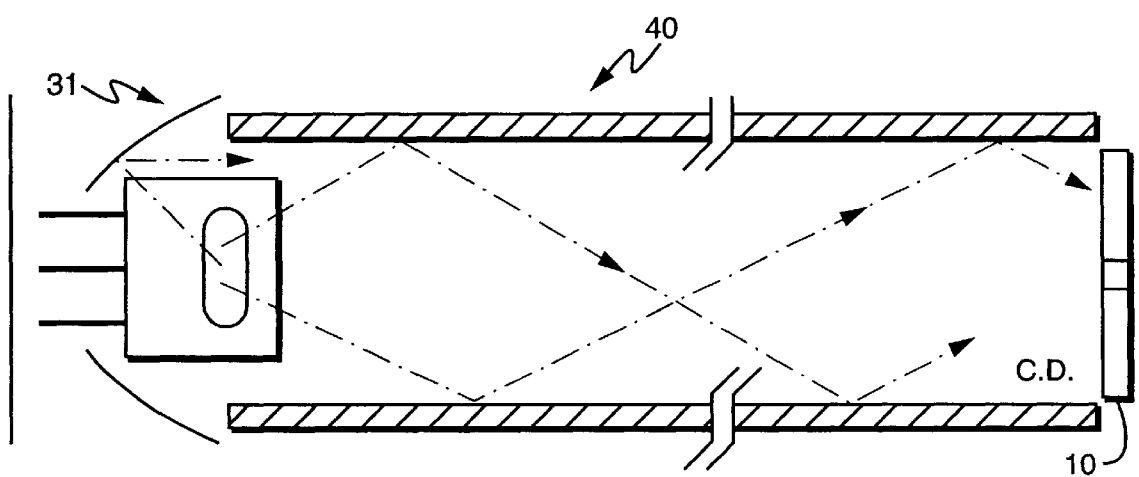
FIG. 4 is a top view of the disk initialization system according to the present invention.

Now referring to FIG. 4, initializing an optical recording medium 10 is accomplished by exposing the material to a source of radiation 31. The generation of a uniform light field can be accomplished in several ways. In a preferred embodiment the source of the radiation is a flash lamp and the radiation is converted into a uniform field by using a light tunnel. Commonly owned U.S. Pat. No. 4,415,958, by Guerra, Device for Illuminating Transparencies, issued Nov. 15, 1983, discloses using an optical tunnel to create a uniform large area light. U.S. Pat. No. 4,415,958 is incorporated by reference herein. Other methods of generating uniform fields include (1) solid light guides, such as glass slabs or fibers, which are suitable only for sources of finite numerical aperture, (2) integrating spheres, which would need to be designed large enough to have a 5" diameter exit port, to be the film plane. This is because the exit port, a lambertian source, would be difficult to reimage onto another plane with reasonable efficiency.

FIG. 4 shows a light tunnel 40 in a preferred embodiment. The typical power density in a preferred embodiment is 600 mJ/cm$^2$ and the flash duration is 1 millisecond or less. The initialization process converts the phase change material from an initial amorphous state to a crystalline state in a single exposure. There is only a small window of power density and flash duration parameters which will completely initialize the phase change material without cracking or destroying the phase change material. The energy used to initialize the phase change material can be controlled by adjusting the voltage supplied to the flash lamp and the duration of the pulse applying power to the flash lamp. The energy used to initialize the phase change material can also be controlled by optical means, for example by placing the source farther from the light tunnel, or by adding an optical filter.

Multi-step Initialization

Experiments conducted on the initialization show that the recording media and the phase change material can be initialized in multiple passes as well as in a single exposure. In an alternate embodiment the power supplied in each successive passes appears to have a cumulative effect when the fluence is at least 0.5 J/cm$^2$. It appears that this may be a way to further reduce the possibility of cracking by reducing the power required with a single exposure and the power output of the radiation source. Multiple pass initialization requires a lower power source of radiation and corresponding lower capacity power supply. While this alternative method includes additional steps, the initialization passes can be separated in time. Another unexpected benefit of multiple flash initialization is the resulting crystalline structure which supports the subsequent writing and reading of a smaller spot. It may be that the first flash exposure, while insufficient to fully initialize the media, creates a latent predisposition to crystallization by the formation of very small seeds of crystallization. This allows the subsequent flash or flashes to fully develop these seeds into the crystallized/initialized state. Therefore, it may be advantageous in some media products to stop the initialization process at the predisposition phase, such that the laser in the drive is able to expose these seed sites with the result that a crystallized mark develops around the seed in a much more restricted way than in the fully initialized media, i.e. smaller marks are written with the larger laser spot.

Computer Peripheral

In another embodiment (not shown), the source of radiation can be mounted in an optical CD read/write device and can be used to erase an entire CD in a single exposure or multiple exposures instead of erasing each track with a limited duty cycle read/write laser and power supply.

Web Production

The recording media can be produced in a continuous web and be processed into disk format. One process to manufacture R/W media on a web would include the following steps:

mylar web construction, coating, emboss master, coating chamber for high index dielectric lens, phase change material deposition, phase change material initialization, and die cut final initialized medium.

Figure 5:
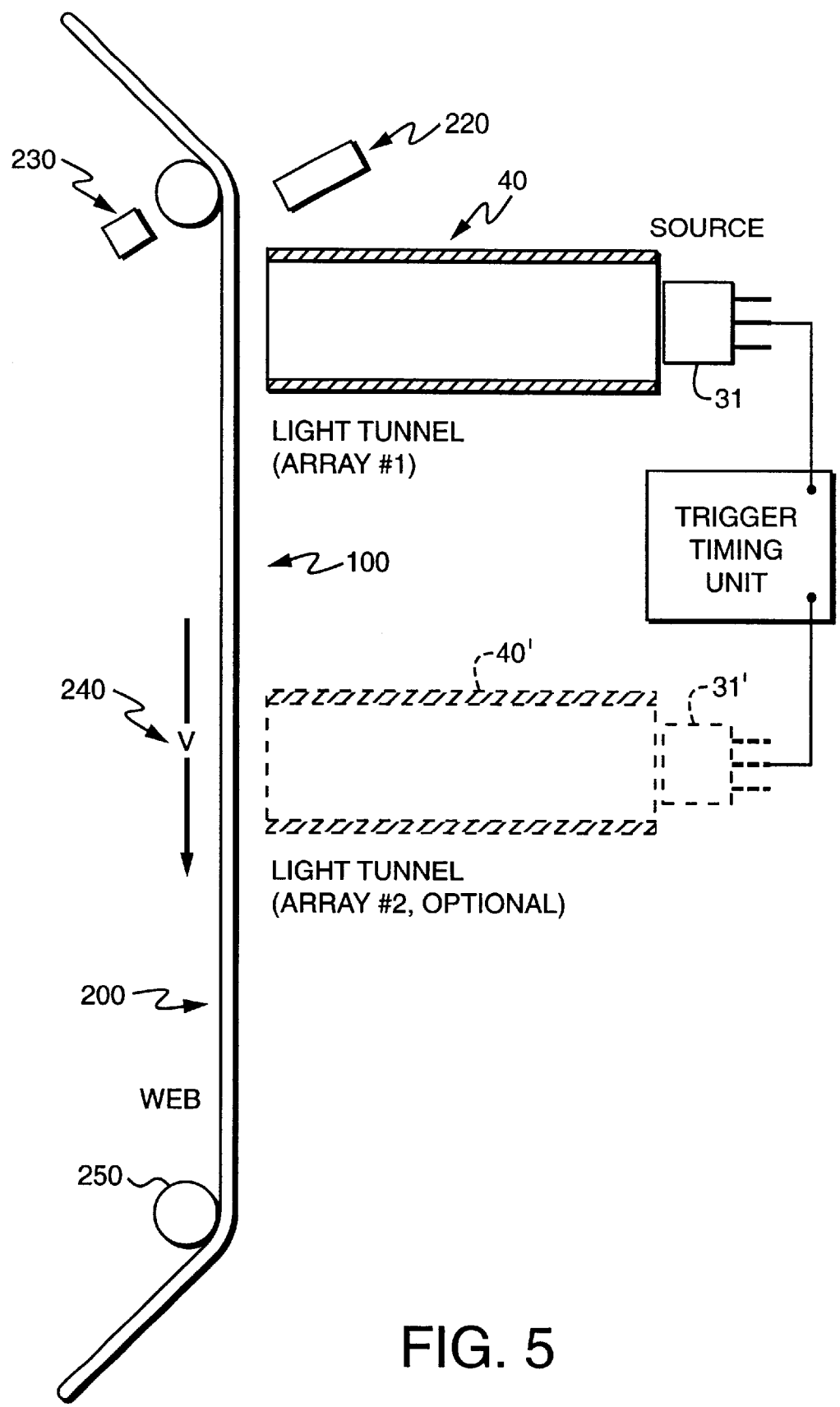
FIG. 5 is a side view of the initialization of a phase change material on a continuous production web according to the present invention.
Figure 6:
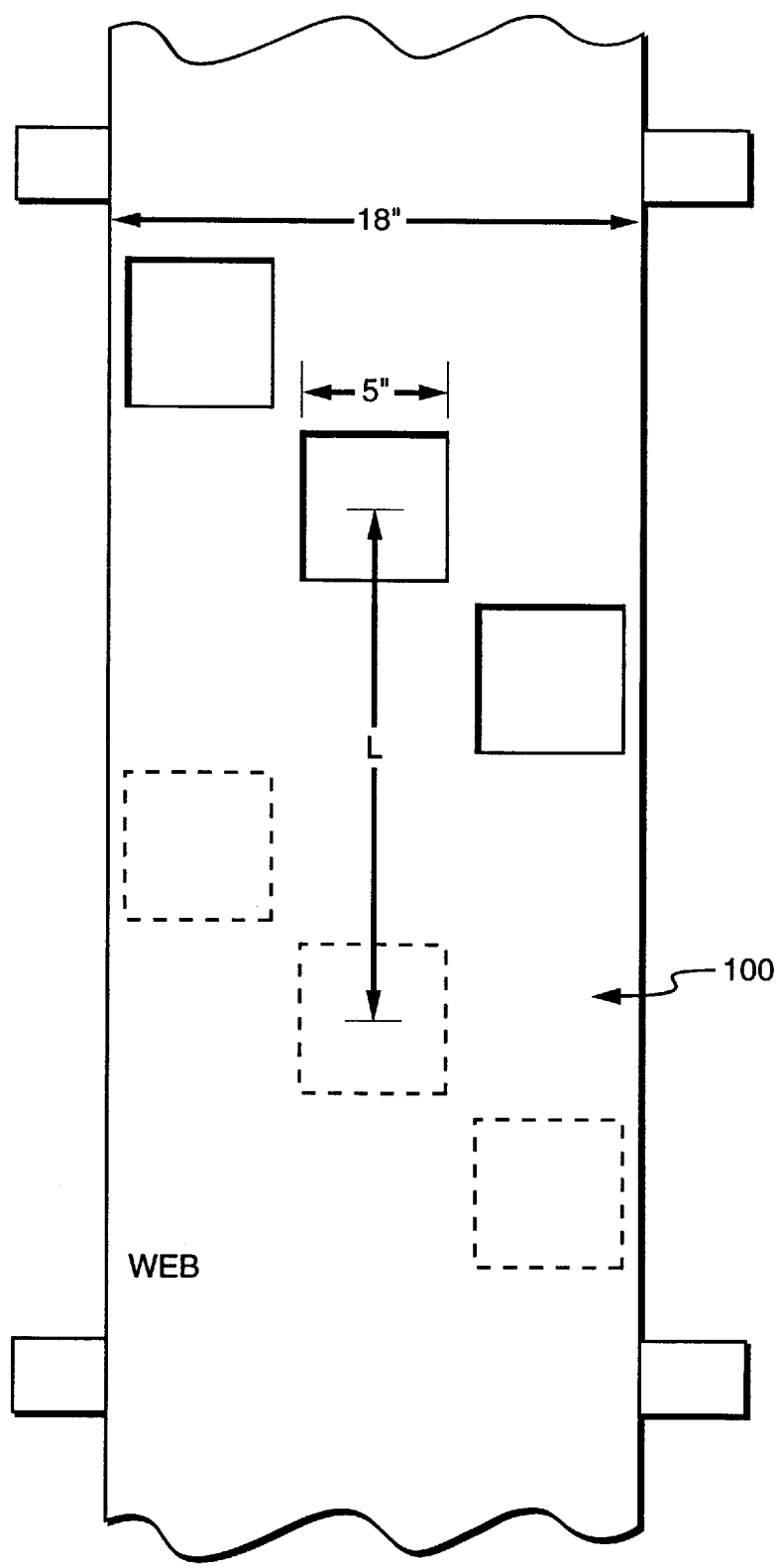
FIG. 6 is a top view of the initialization of a phase change material on a continuous production web according to the present invention.

In order to initialize the recording media on a moving web, a large area of the phase change material encompassing each recording medium must be exposed at the same time, and double exposure of any part of a recording medium must be avoided. Referring now to FIG. 5, the phase change material in web format 100 is processed on a continuous web 200. The system contains a sensor 220 to detect the position of the web in order to control the area to be exposed. The location of media to be initialized can be detected mechanically 220 or by use of a vision system (not shown). The position information is used to synchronize the exposure of the recording medium. The phase change material can be exposed by a single source 31 and light tunnel 40 or additional sources 31' and light tunnels 40' may be used in an overlapped configuration to utilize smaller power supplies and smaller fields. As shown in FIG. 6, several sources can be used to expose the web formatted phase change material 100.

Continuous Illumination

In an alternative embodiment, continuous illumination (not shown) is provided and directed to a region of the web and the medium in web format is moved past the source of illumination at a speed sufficient to produce the desired power density and duration at the medium which will initialize the phase change material. The system has sensors 230 and variable speed control 240 of the web in order to regulate the energy absorbed by the phase change material. The continuous illumination source can be placed above the continuous web or can be placed inside a transparent drum 250 around which the continuous web passes.

While the invention has been described with reference to particular embodiments, it will be understood that the present invention is by no means limited to the particular constructions and methods herein disclosed and/or shown in the drawings, but also comprises any modifications or equivalents within the scope of the claims.

What is claimed is:

1. A system for initializing a recording medium comprising phase change material having at least one of an amorphous state and a crystalline state, transformation between the states being effected by incident radiation, said system comprising:

a source of radiation;

means for converting said source of radiation into a substantially uniform field of radiation over a predetermined area having a first dimension and a second dimension, said first dimension being substantially equal to the width of the recording medium phase change material; and means for controlling the power of said uniform field of radiation to produce a surface power density and exposure duration sufficient to convert the phase change material into the crystalline state without cracking the material.

2. The system of claim 1 wherein said source of radiation comprises coherent radiation.

3. The system of claim 1 wherein said source of radiation comprises a flash lamp.

4. The system of claim 1 wherein said means for controlling the power comprises means for regulating the duration of the radiation provided by said source of radiation.

5. The system of claim 1 wherein said means for controlling the power comprises means for regulating the intensity of the radiation provided by said source of radiation.

6. The system of claim 1 further comprising a mask disposed between said source of radiation and the recording medium for selectively passing said uniform field of radiation to record a pattern on the phase change material of the recording medium.

7. The system of claim 6 wherein said pattern comprises timing information.

8. The system of claim 6 wherein said pattern comprises security information.

9. The system of claim 6 wherein said pattern comprises data information.

10. The system of claim 6 wherein said mask further comprises a spatial light modulator.

11. The system of claim 10 wherein said spatial light modulator consists of a liquid crystal device and controller.

12. A system for formatting a continuous web of recording media comprising phase change material having at least one of an amorphous state and a crystalline state, transformation between the states being effected by incident radiation said system comprising:

a source of radiation;

means for converting said radiation into a substantially uniform field of radiation over a predetermined area having a first dimension and a second dimension;

means for transporting the continuous web of recording media; and means for controlling the power of said uniform field of radiation to produce a surface power density and exposure duration sufficient to convert the phase change material into the crystalline state without cracking the material.

13. The system of claim 12 wherein said means for controlling the power comprises means for regulating the duration of the radiation provided by said source of radiation.

14. The system of claim 12 wherein said means for controlling the power comprises means for regulating the intensity of the radiation provided by said source of radiation.

15. The system of claim 12 further comprising:

means for detecting the position of recording media on the continuous web; and control means to synchronize the exposure of the recording medium.

16. The system of claim 15 wherein the source of radiation comprises:

plurality of sources of radiation and means for converting said radiation into a plurality of substantially uniform fields; and sequencing means to control the exposure.

17. The system of claim 12 wherein the source of radiation is a continuous source of radiation.

18. The system of claim 17 further comprising:

means for detecting the movement of the continuous web; and control means to control the speed of the continuous web.

19. A method for initializing a recording medium comprising phase change material, said method comprising the steps of:

obtaining the recording medium wherein said phase change material is in an amorphous state;

providing a source of radiation;

converting the source of radiation into an essentially uniform field of illumination over a predetermined area having a first dimension and a second dimension, said first dimension being substantially equal to the width of said medium; and irradiating the phase change material with said uniform field illumination such that an incident surface energy transfer of radiation is sufficient to induce a phase change from the amorphous state to the crystalline state at a recording surface of the recording medium without cracking the phase change material.

20. The method of claim 19 further comprising the step of masking the recording medium.

21. The method of claim 19 wherein the phase change material is provided in a continuous web.

22. The method of claim 21 wherein said source of radiation further comprises a plurality of sources disposed to cover the entire active area of the web.

23. The method of claim 22 further comprising the step of synchronizing a plurality of uniform fields of illumination.

24. The method of claim 19 wherein said source of radiation further comprises a flash lamp.

25. The method of claim 21 wherein said source of radiation further comprises a continuous source of radiation.

26. The method of claim 21 wherein said source of radiation is disposed above said continuous web.

27. The method of claim 21 wherein said source of radiation is disposed in a transparent drum in optical communication with said continuous web.

28. A method for formatting a recording medium comprising phase change material said method comprising the steps of:

obtaining the recording medium wherein said phase change material is in an amorphous state;

providing a source of radiation;

converting the source of radiation into an essentially uniform field of illumination over a predetermined area having a first dimension and a second dimension, said first dimension being substantially equal to the width of said medium;

irradiating the phase change material at least once with said uniform field illumination such that an incident surface energy transfer of radiation is sufficient to partially induce a phase change from the amorphous state to the crystalline state at a recording surface of the recording medium; and irradiating the phase change material a final time with said broad field illumination such that an incident surface energy transfer of radiation is sufficient to induce a phase change from the amorphous state to the crystalline state at a recording surface of the recording medium.

29. The method of claim 21 further comprising the steps of:

detecting the movement of the continuous web; and controlling the speed of the continuous web.

* * * * *